United States Patent [19]

Gessford

[11] Patent Number: 4,563,321
[45] Date of Patent: Jan. 7, 1986

[54] METHOD OF PRODUCING A PLASTIC UNITARY CURVED STRUCTURE WITH TWO SURFACES AND A HONEYCOMB SHAPED CORE

[76] Inventor: James D. Gessford, P.O. Box 5856, Bancroft, Id. 83217

[21] Appl. No.: 188,111

[22] Filed: Sep. 17, 1980

Related U.S. Application Data

[60] Continuation of Ser. No. 841,974, Oct. 13, 1977, abandoned, which is a division of Ser. No. 700,214, Jun. 28, 1976, abandoned, which is a continuation-in-part of Ser. No. 513,072, Oct. 8, 1974, abandoned.

[51] Int. Cl.$^4$ ............................................. B32B 31/04
[52] U.S. Cl. ...................................... 264/255; 156/190; 156/196; 156/197; 156/224; 156/249; 264/225; 264/257; 264/258; 264/339; 428/116; 428/117; 428/118
[58] Field of Search ............... 264/255, 257, 258, 310, 264/311, 219, 225, 312, 285, 339, 245, 338; 428/116, 117, 118; 156/196, 197, 212, 221, 222, 224, 249, 323, 190

[56] References Cited

U.S. PATENT DOCUMENTS

| | | | |
|---|---|---|---|
| 2,421,101 | 5/1947 | Lakso | 264/313 |
| 2,782,458 | 2/1957 | Emmert et al. | 156/323 |
| 2,805,974 | 9/1957 | Brucker | 428/116 |
| 2,815,795 | 12/1957 | Poel | 156/197 |
| 2,877,150 | 3/1959 | Wilson | 156/190 |
| 2,978,806 | 4/1961 | Herbert | 156/323 |
| 2,999,780 | 9/1961 | Perrauct | 264/311 |
| 3,136,674 | 6/1964 | Dunkle et al. | 156/218 |
| 3,163,689 | 12/1964 | Ives | 156/247 |
| 3,306,956 | 2/1967 | Barnette | 264/245 |
| 3,617,416 | 11/1971 | Kromrey | 156/197 |
| 3,812,074 | 5/1974 | Oswitch et al. | 264/338 |
| 4,002,714 | 1/1977 | Usui | 264/311 |
| 4,081,302 | 3/1978 | Drostholm et al. | 156/195 |

FOREIGN PATENT DOCUMENTS 1779024 8/1971 Fed. Rep. of Germany ...... 428/116

OTHER PUBLICATIONS

Glasstone, Textbook of Phys. Chem., Van Nostrand 2nd Ed (1962), pp. 481–487.
Bjorksten et al., Reinhold, N.Y. (1956), pp. 50, 51 & 170, Polyesters and Their Applications.
Michels et al., Elements of Modern Physics, Van Nostrand, N.Y. (1952), pp. 498–502.

Primary Examiner—James Derrington
Attorney, Agent, or Firm—Penrose Lucas Albright

[57] ABSTRACT

A method of producing a unitary curved structure having a honeycomb core by coating a mold with gel, applying a layer of reinforced fiberglass plastic to the gel to receive, after partial curing, a light layer of chopped glass fibers (about ¾ ounces/sq. ft.) and a mixture of catalyzed resin and chopped fiber strand. The resulting surface may be rolled to remove bubbles and oversprayed with catalyzed resin. A Raw Kraft paper honeycomb is placed into the wet laminate and completely covered with wax paper weighted with sand bags to approximately 10 pounds per square foot to press the honeycomb into place and seal same. The resin is absorbed in and climbs the honeycomb walls, and heat and styrene gas are liberated into the cells. The bags and wax paper are removed after partial cure, excess styrene fumes are blown away, and the honeycomb is lightly oversprayed with a catalyzed resin. A layer (¾ ounce of fibrous glass mat containing catalyzed resin) is carefully rolled over the top of the honeycomb core, the mat being sufficiently porous so that trapped styrene gas escapes from the honeycomb cells. After the styrene gas is completely vented, an outer skin of further fiberglass mat is applied, fully saturated with catalyzed resin, to seal the porous mat and allowed to cure. The result is a bondless unitary curved resin structure having parallel outer resin surfaces reinforced by fiberglass, and a honeycomb core of the same resin reinforced by paper.

13 Claims, 7 Drawing Figures

U.S. Patent   Jan. 7, 1986   Sheet 1 of 3   4,563,321
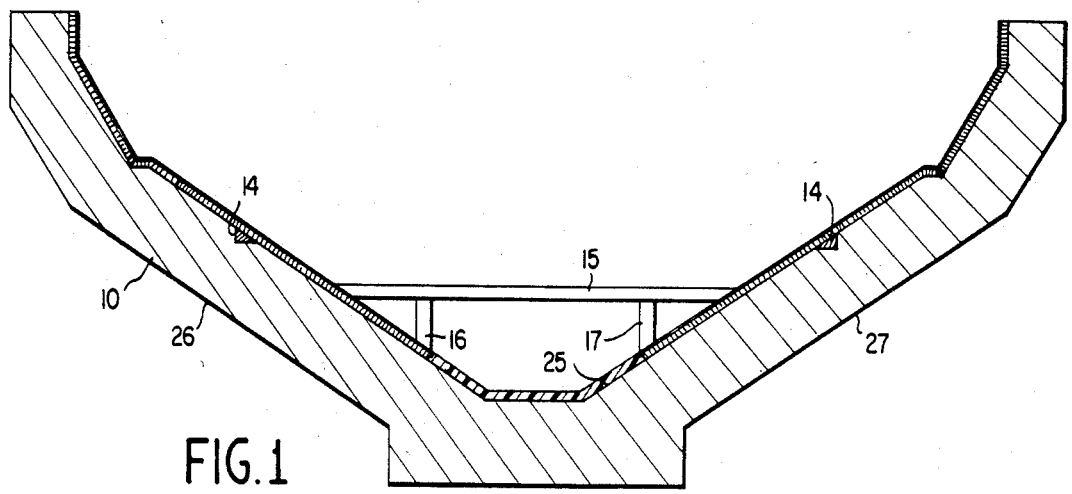
FIG.1
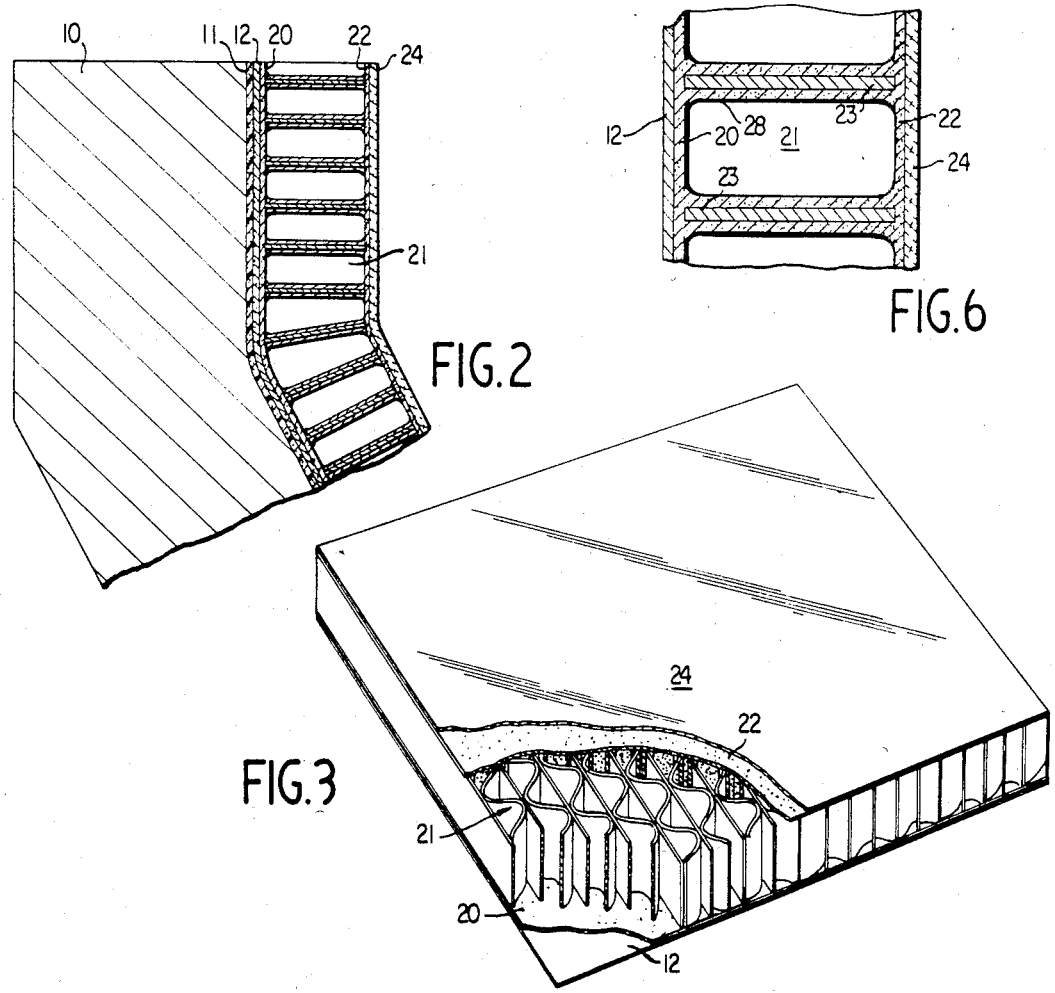
FIG.2
FIG.6
FIG.3

METHOD OF PRODUCING A PLASTIC UNITARY CURVED STRUCTURE WITH TWO SURFACES AND A HONEYCOMB SHAPED CORE

RELATED APPLICATIONS

This is a continuation of application Ser. No. 841,974, filed Oct. 13, 1977, now abandoned, which is a division of application Ser. No. 700,214, filed June 28, 1976, now abandoned, which is a continuation-in-part of Ser. No. 513,072, filed Oct. 8, 1974, now abandoned.

SUMMARY OF THE INVENTION

The invention relates to a method of producing a honeycomb-type structure for pipes and tanks for carrying and holding chemicals and the like, for boat hulls and also for certain applications wherein insulation is desired.

In the construction art, panels of varying thickness which contain honeycomb cores have long been used primarily for flat articles such as doors and panels, but also as curved articles such as poles and boat hulls. Although the honeycomb is traditionally paper impregnated with thermal setting phenolic resin, the resulting article is relatively lightweight. It is well known that the panels made with such construction exhibit surprising strength because of the increased bending resistance gained by separating two surfaces of the panel with a thick web of rigid resin treated honeycomb.

The inventor recognized that if he could use a soft, flexible, unimpregnated paper honeycomb as a wick to pull resin from the surface layer reservoirs into a substantial, in situ, honeycomb web he would completely avoid any adherence problems and could form flat surface structures as well as curved and vertical structures such as boat hulls, pipes and tanks which would be light in weight while retaining a superior strength ratio compared to that of conventional construction. Moreover, there would be a considerable saving in raw material cost, flotation of the hull materials would be inherent, certain reduction of sound conduction would result, and finally distortion would be minimized—particularly over years of usage.

With certain experimentation, boat hulls, pipes and tanks with resin honeycomb cores patterned by the paper honeycomb were produced by the inventor and the advantages he hoped to achieve resulted. An important aspect of the invention relates to placing the raw, unimpregnated honeycomb in a reservoir of catalyzed liquiform resin so that it is held in place by the glass matrix surface layer, the sealing of the top of the said honeycomb with wax paper or other impervious film, and the allowing of sufficient time for the resin to climb up the paper honeycomb cell walls and thus form a resin honeycomb in the pattern of the paper honeycomb.

After the resin honeycomb is formed, the wax paper, or other seal, is removed to allow the styrene gas liberated during the curing of the resin to escape before the second imperforate surface layer is applied.

BRIEF DESCRIPTION OF THE DRAWINGS

FIG. 1 shows a cross-section of a boat hull in a mold which is produced in accordance with the invention;

FIG. 2 is an enlarged sectional view of the boat hull which illustrates the various steps using the inventive method disclosed herein;

FIG. 3 shows a panel with portions broken away to illustrate the structure of a finished product in accordance with the invention;

FIG. 6 is a detail view showing the structure of an individual cell of the honeycomb-type core in a panel produced in accordance with the invention.

DESCRIPTION OF THE PREFERRED EMBODIMENTS

Figure 5:
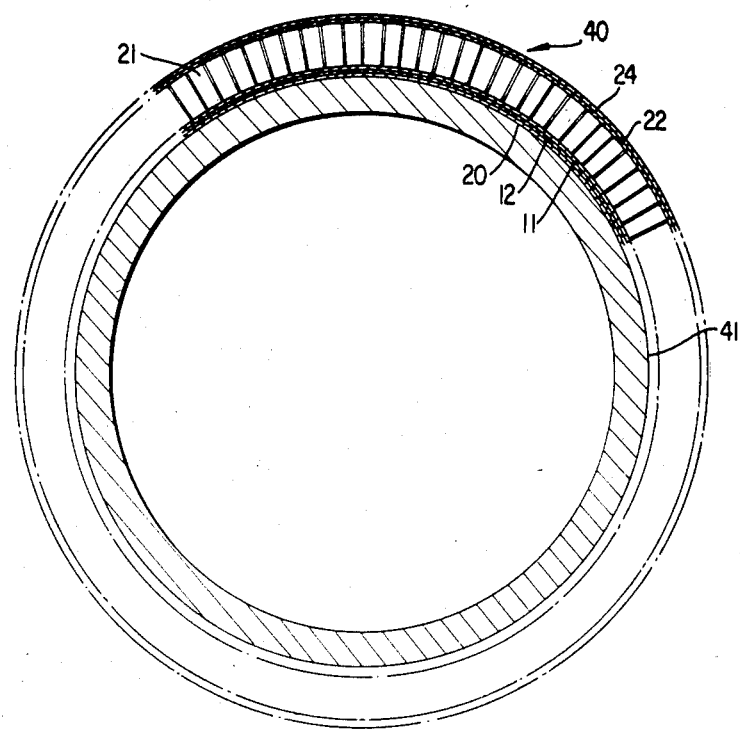
FIG. 5 is a cross-section of a pipe produced in accordance with the invention.

In producing a panel in accordance with the invention, first the mold 10 has a surface material, gel coating 11, applied thereto in a conventional manner. Next, an imperforate skin 12 composed of liquiform catalyzed resin, reinforced with fiberglass is applied to the surface material. It is to be understood that this layer becomes the outer surface of the honeycomb-shaped panel and its thickness determines the outer sheer strength of the panel or wall of the end product. After the outer surface is then allowed partially to cure, wood structural members such as the strake filler 14, the plywood bulk bottom 15 and the wood support stringers 16 and 17 may be inserted. Mold 10 is then set in an angular disposition to minimize resin drainage and a mixture of polyester resin, catalyst and chopped fiberglass designated in FIG. 2 as layer 20, is applied as a reservoir of resin held in place by the matrix of glass fibers. The ratio of the resin to the chopped fiber is preferably about 4-1 and approximately ¾ of an ounce per square foot is applied. Next, layer 20 is rolled out around the edges where the honeycomb is to be applied to minimize subsequent clean-up problems. In addition, this laminate, layer 20, may be rolled free of bubbles or not rolled at all depending upon the skill of the chopper gun operator, his assistants and the styrene content of the resin. For most applications, a roll-out of layer 20 is not necessary. A paper honeycomb 21 is first cut to the exact dimensions and, with honeycomb 21 readily available, layer 20 is given a light overspray of catalyzed resin with a greater amount of overspray being provided to the areas of mold 10 having a higher elevation relative to the remainder of the mold. With the overspray applied, the honeycomb is placed directly into the resulting wet layer 20 with a minimum amount of movement once honeycomb 21 comes into direct contact with layer 20. The outer surface of the honeycomb 21 is next entirely covered and sealed with a good grade of wax paper or the like and the same is weighed with sandbags to the extent of about ten pounds per square foot (fifty kilograms per square meter) or equivalent pressure is otherwise applied. Complete coverage of the honeycomb 21 with wax paper is important inasmuch as it causes retention of heat and of styrene gas which is liberated into individual cells and it ensures complete resin saturated and coverage of the walls of the paper honeycomb 21. An even application of the ten pounds of sandbags or other pressure ensures a good continuous resin layer between honeycomb 21 and layer 20. A good size for a sandbag is ten to fourteen inches (twenty-five by thirty-five centimeters), the bag being loosely filled with ten pounds (about four and one-half kilograms) of good clean sand.

Following this step, after about twenty minutes to allow for a partial cure, the sandbags and wax paper are removed and all excess styrene fume are blown from the resin covered cells of honeycomb 21. The structure is then allowed to cure for about twenty minutes at room temperature of about 70° F. (21° C.), or longer if desirable to form a good gel. However, prior to commencing on this curing step, the surface of honeycomb 21 and the cell walls are given a light overspray of a catalyzed resin so as completely to saturated and coat the walls of the paper honeycomb and provide a thick walled resin cell honeycomb structure. It is important that the cells of honeycomb 21 not be flooded so as to be filled with the resin because this tends to defeat the purpose of the use of a honeycomb and can also cause excess shrinkage resulting in a "photographing" of the honeycomb through the outer skin 12.

Once a cure stage has been reached where no further styrene fumes are given off by the resin, the inner skin or layers are applied. First, all rough spots, dirt and wax on the honeycomb are removed by grinding or sanding for the purpose of ensuring a continuous resin structure between honeycomb 21 and the outer surface layer to be applied. The first layer 22 is the application of a ¾ ounce fibrous glass mat which is partially saturated with a catalyzed resin. In this application, such mat is carefully rolled into place over the surface of core 21. It has been determined from experience that layer 22 should be rolled with care in one direction only starting with an innermost area of the core 21 and rolling to the extreme edges thereof. Useful for this purpose is a standard ¾" by 3" roller which is applied with very slight pressure and a slight dragging motion. In practice, it has been ascertained that not more than two square feet at a time should be rolled and that layer 22 should be rolled twice. It is vital that layer 22 be sufficiently porous to allow the escape of any trapped styrene gas from the honeycomb cells. Once layer 22 is in place, it should not be disturbed until it has cured. However, after air has been rolled out of the mat covering the honeycomb 21, an area around the honeycomb should also be rolled, in effect sealing same off. It is preferred where layer 22 seals off the edge of the honeycomb 21 and comes into contact with skin 12 that an angle of about forty-five degrees is the maximum which should be attempted without creating additional problems. While layer 22 is curing, if a bubble commences to form, it should be immediately punctured and layer 22 in the area involved rolled back into place. It is important that a full cure occur at this stage. Thereafter, a further imperforate skin 24 may be applied. Skin 24 may be a further ¾ ounce fiberglass mat saturated with catalyzed resin. After skin 24 is in place, it has been found advisable to give the entire finished mold structure a liberal overspray of catalyzed resin. This produces a better looking product and additionally ensures that any pin holes or openings through the honeycomb portion of the structure are positively sealed. A solid plastic or plywood bottom is next installed. Subsequently, if in the finished product it becomes necessary to drill holes or make any fastenings to the panel surface, a liberal amount of sealer such as silicone sealer should be applied to the ruptured area to minimize any chance of water intrusion. Referring to FIG. 6, the paper walls 23 are fully saturated and covered with a relatively thick resin coating 28 which joins with layers 20 and 22 which are completely saturated whereby each cell is completely coated on its interior and hermetically sealed with resin, Due to the heat previously generated in the curing process, the pressure of gas trapped in each cell is subsequently less than atmospheric pressure.

The paper honeycomb 21 utilized in the foregoing described process is a product of the Vertical Company of Englewood, Colo. It carries a Vertical designation of ¼-40-50-0% which indicates a type of Kraft paper which is not sized nor impregnated and which is known as raw honeycomb. The sheets of honeycomb are ½" by 24" by 96". The dimensions of the resulting cells of honeycomb 21 are approximately ⅜" by ⅜" by ½" by ½ inches deep. For mildly corrosive conditions a styrene monomer-polyester resin such as Diamond Shamrock Dion 6631 or 6632 may be used. For corrosive conditions Dion 6693 and 6694 may be used. Fire resistance may be combined with corrosive resistance by using Dion 6693 FR or 6694 FR. A MEKP (methyl-ethyl-Ketone Peroxide) catalyst is used.

It is understood that Diamond Shamrock Dion 6631 or 6632 are polyester resins produced by the condensation of isophthalic acid with propylene glycol, monomeric styrene being used as a cross-linking agent and a peroxide as a catalyst. Similarly Diamond Shamrock Dion 6694 FR is a polyester resin produced by condensation of a modified bis phenol A and a brominated glycol with antimony oxide providing a synergistic effect. Again monomeric styrene is the cross-linking agent and a peroxide is used as a catalyst.

Figure 4:
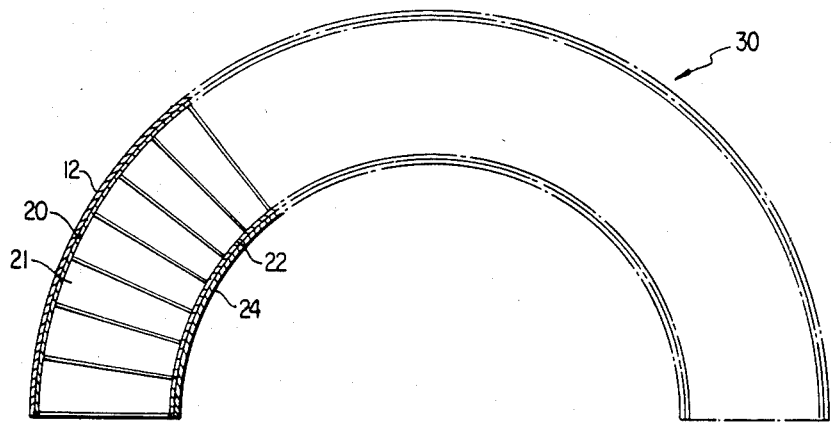
FIG. 4 is a cross-section showing a semi-circular insulation panel in accordance with the invention.

As seen in FIG. 4, a one-half cylindrical insulation cover 30 preferably has a porous layer 22 applied on the interior of honeycomb 21 and provides a greater thickness as desired to improve the heat insulating properties of cover 30. Moreover, rather than fully to saturate layer 22 in a further application of a catalyzed resin in layer 24 as occures in the process heretofore described, it may be allowed to remain somewhat porous to permit individual cells of core 21 to "breathe" so as to limit any build-up of internal pressure in the cells due to the effects of heating. Insulation of this type is considerably stronger than most conventional insulation and thus is advantageous for use wherein a strength requirement is a major factor.

The pipe illustrated in FIG. 5 is manufactured by the same process and essentially the same materials as described with reference to FIGS. 1, 2, 3 and 6. A cylindrical mandril 41 is employed, instead of mold 10, and is rotated at a rate of about seven feet (two meters) of outside circumference per minute. The mandril is subjected to the following steps: (1) It is provided with a gel coat of resin of chemical composition suitable for the product to be conveyed by the resulting conduit. (2) In addition to making a reservoir of liquiform resin in a chopped fiberglass matrix, a continuous filament, stranded fiberglass may be saturated with the catalyzed resin and spirally or helically wound onto the mandrel, a second layer of catalyzed resin saturated stranded fiberglass being added if the pipe is required to withstand high pressure. (3) Raw paper honeycomb is applied direcly onto the resin reservoir. (4) A vapor tight sealing cylinder made of film or thin metal sheet is temporarily applied to the top edge of the honeycomb 21 and tightened to a pressure of eight to ten pounds per square foot. (5) Sufficient cure time is allowed for the resin to liberate styrene gas and heat from the exothermic reaction and for the resin to climb the cell walls of the paper honeycomb to form a thick coating of gel. (6) Upon exhausting the styrene gas from the cells, step (2)

above is repeated. (7) The resulting structure is allowed to cure and removed from the mandrel.

A ten inch (twenty-five centimeter) inside diameter pipe so produced from a chopped fiberglass mat weighs about ninety pounds (40 kilograms) per twenty feet (6.1 meters) of length. Its pressure rupture strength is in excess of 270 pounds per square inch (nineteen kilograms per square centimeter). This is about four times the rupture strength of plastic fiberglass pipes of the same effective diameter and weight but without the resin honeycomb construction. Ten inch inside diameter pipes with a pressure rupture strength of 3,000 pounds per square inch (210 kg/cm$^2$) have been made by adding a hoopwound fiberglass filament to the inside and to the outside surface layers.

Figure 7:
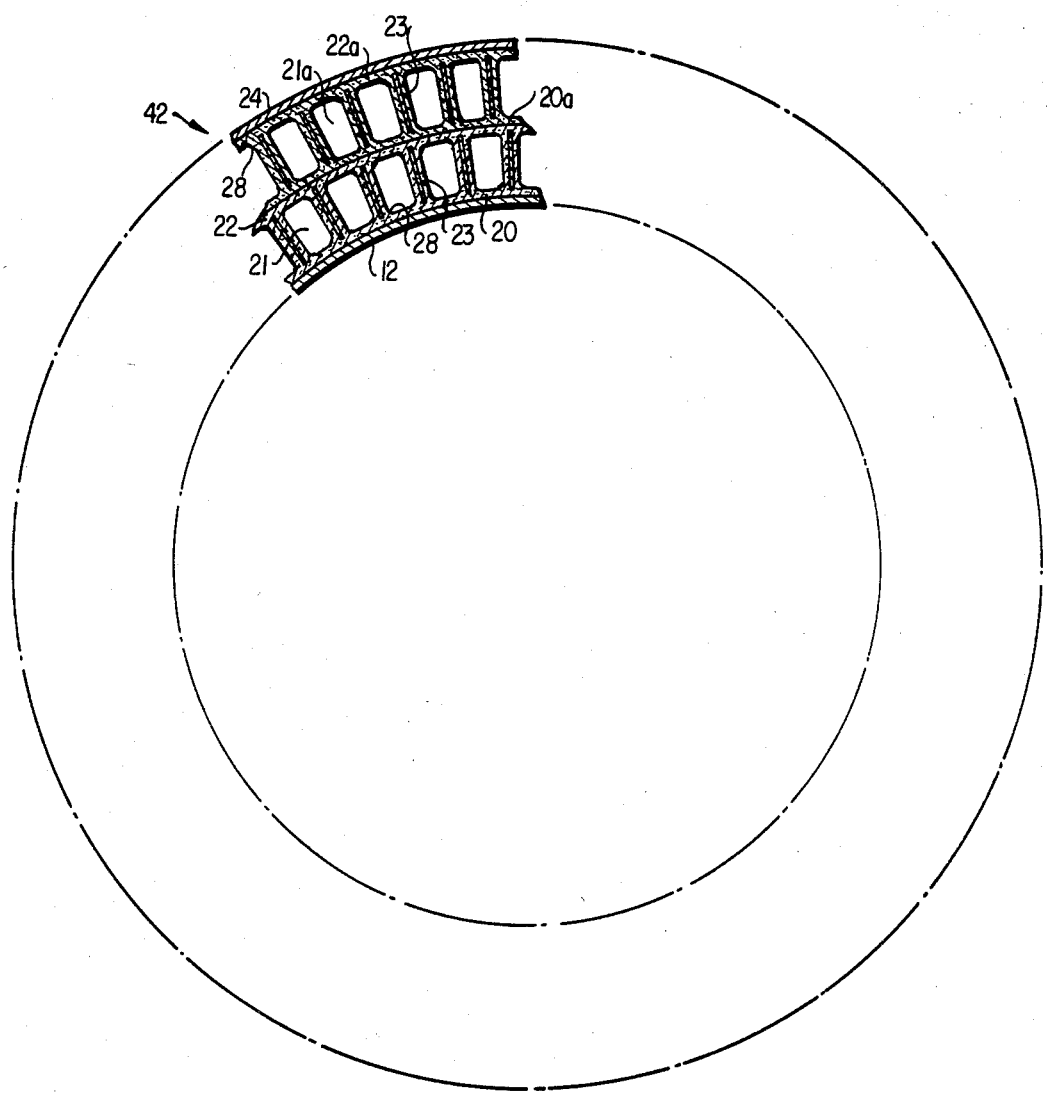
FIG. 7 is a fragmentary view cross-section of the wall of a heavy-duty pipe with two honeycomb cores and an additional surface layer.

For specific chemical uses, special resin liners are incorporated into the pipe or tank. Or a special coating is optionally applied to the outside for decorative or utility purposes. These liners and coatings do not affect the unitary features of the subject invention. For large diameter tanks or pipes having the honeycomb of the invention the process may be repeated as necessary to provide additional rigidity and rupture strength. For example, FIG. 7 shows a pipe which has an imperforate skin 12 as interior surface, a layer 20, a resin coated honeycomb 21, a further layer 22 with a layer 20a, similar to layer 20, applied thereto. A further honeycomb 21a is provided on layer 20a coated with a resin 28, which has a layer 22a, similar to layer 22, applied thereover. Finally, an imperforate skin 24 covers the exterior surfaces of pipe 42.

Although in the description of the various embodiments, the terms "layers," "coatings" and the like have been used for the components 20, 20a, 22, 22a and 28, in fact in the product resulting from the disclosed process, these components are fused together so as to be essentially integral with one another and do not comprise well defined separate elements.

Having thus described my invention, what I claim as new and desire to secure by Letters Patent of the United States is:

1. In a method of forming a unitary curved structure with a honeycomb core having impervious surfaces on both sides of said core, the steps of applying a catalyzed liquiform resin containing styrene with a matrix of material performing the function of holding a reservoir of said catalyzed resin in place onto a curved form; placing a honeycomb-type structure capable of being saturated by said liquiform resin as used in the method into said reservoir of catalyzed resin; sealing the top of said honeycomb structure with an impervious layer, permitting said catalyzed resin to be wicked into said honeycomb structure whereby it substantially saturates throughout and coats the walls of the honeycomb structure without filling the cells thereof and reaches a gel stage while said seal is applied; removing said seal and venting styrene gas and vapor from said honeycomb structure; applying a further layer comprised of said catalyzed resin and a fibrous mat over said honeycomb structure which substantially bridges said cells, said further layer fusing with said resin coat and being sufficiently permeable so that further styrene gases and vapors liberated during the curing of said resin throughout the structure are vented from said cells through said further layer; and said gases and vapors have been sufficiently vented from said cells applying more resin over said further layer permanently to seal and strengthen said further layer.

2. A method in accordance with claim 1, which comprises the initial step of applying a catalyzed liquiform resin to said form before applying said resin with said matrix.

3. A method in accordance with claim 1, wherein said matrix of material comprises fiberglass.

4. A method in accordance with claim 1, wherein said honeycomb-type structure comprises unimpregnated kraft paper.

5. A method in accordance with claim 1, wherein said sealing step is performed by placing weight distributed over said impervious layer.

6. A method in accordance with claim 5, wherein said weight is approximately ten pounds per square foot.

7. A method in accordance with claim 1, wherein said sealing step extends a sufficient period of time whereby when said impervious layer is removed said honeycomb structure is retained in place on said form by the partially cured said catalyzed resin.

8. A method in accordance with claim 1, wherein said resin is a polyester-type resin.

9. A method in accordance with claim 3, wherein the catalyst for said resin is methyl-ethyl-ketone peroxide.

10. A method in accordance with claim 1, wherein said further layer comprises a fiberglass mat saturated with catalyzed resin.

11. A method in accordance with claim 5, wherein said form is rotated during the formation of the structure at least while said resin is wicked into said honeycomb structure.

12. Method of producing a unitary curved resin structure with a honeycomb core having imperforate outer surfaces which comprises applying a catalyzed liquiform resin containing styrene to a matrix of fibrous material performing the function of holding a reservoir of said catalysed resin in place on a curved form; placing a porous honeycomb type structure into said reservoir of catalyzed resin; sealing the top of said honeycomb structure with removable sealing means; performing the function of promoting wicking of said catalyzed resin into said honeycomb structure substantially covering the outside and, saturating the porous interior of the walls of the honeycomb structure without filling the cells thereof and to reach a gel stage while said sealing means is applied; removing said sealing means performing the function of permitting gas and vapor to escape from said honeycomb structure; placing a layer of fibrous material and applying additional said catalyzed resin thereto over said honeycomb structure of such character that it substantially bridges said cells and is sufficiently permeable for performing the function of venting gases and vapors liberated into said cells during subsequent curing of said resin throughout the structure; permitting said cells to be thoroughly vented through said permeable layer; and applying more resin over said layer permanently to seal and strengthen said layer.

13. In a method of producing a structure with a honeycomb core having a first impermeable layer and said honeycomb core fused thereto, the steps of providing a second layer of fibrous material spaced from said first layer over said honeycomb and applying to said second layer a catalyzed resin containing styrene which is of a character that it substantially bridges the cells of said honeycomb without filling them and is sufficiently permeable so that it performs the function of venting gases and vapors liberated into the honeycomb cells during the curing of said resin.

* * * * *